US009467827B2

(12) United States Patent
Maria

(10) Patent No.: US 9,467,827 B2
(45) Date of Patent: Oct. 11, 2016

(54) DIGITAL MOBILE RADIO CELLULAR MESSAGING

(71) Applicant: AT&T Mobility II LLC, Atlanta, GA (US)

(72) Inventor: Arturo Maria, Bothell, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 477 days.

(21) Appl. No.: 13/687,180

(22) Filed: Nov. 28, 2012

(65) Prior Publication Data

US 2014/0146744 A1 May 29, 2014

(51) Int. Cl.
*H04W 4/14* (2009.01)

(52) U.S. Cl.
CPC ...................... *H04W 4/14* (2013.01)

(58) Field of Classification Search
CPC ... H04W 84/08; H04W 76/005; H04W 4/10; H04W 4/14; H04L 29/06068
USPC ................................. 370/466, 467
See application file for complete search history.

(56) References Cited

U.S. PATENT DOCUMENTS

| 5,852,781 | A * | 12/1998 | Ahvenainen ............... 455/509 |
| 8,634,799 | B1 * | 1/2014 | Economy et al. .......... 455/404.1 |
| 2004/0203948 | A1 * | 10/2004 | Provost .................. H04W 4/12 455/466 |
| 2005/0255832 | A1 * | 11/2005 | Turcanu ................. 455/412.1 |
| 2009/0054029 | A1 * | 2/2009 | Hogberg et al. ........... 455/404.2 |
| 2009/0239527 | A1 * | 9/2009 | Forsten ................ H04W 4/10 455/426.1 |
| 2011/0216746 | A1 * | 9/2011 | Tay ........................ 370/337 |
| 2012/0170529 | A1 * | 7/2012 | Corbellini et al. ........ 370/329 |
| 2013/0059622 | A1 * | 3/2013 | Agulnik et al. .......... 455/518 |
| 2014/0004845 | A1 * | 1/2014 | Marque-Pucheu et al. ............. 455/422.1 |

FOREIGN PATENT DOCUMENTS

EP           644702 A1 *  3/1995

OTHER PUBLICATIONS

Bill Fillman, "Introduction to DMR and the DMR Association" Tait Communications, Sep. 14, 2012, 34 pages.
ETSI, "Digital Mobile Radio (DMR)" ETSI World Class Standards, www.etsi.org, 2 pages.
Hytera Respond & Achieve, "Hytera DMR Trunking Products and Solutions" Hytera Communications Corporation Limited, 10 pages.
Radio-Electronics, "Business Radio / Private Mobile Radio Basics" http://www.radio-electronics.com/info/pmr-business-land-mobile-radio/pmr-systems/basics-tutorial.php.

* cited by examiner

*Primary Examiner* — Paul H Masur
*Assistant Examiner* — Kabir Jahangir
(74) *Attorney, Agent, or Firm* — Amin, Turocy & Watson, LLP

(57) ABSTRACT

Communication is facilitated between cellular and digital mobile radio devices. In one aspect, a digital mobile radio messaging gateway is deployed within a cellular network that allows cellular devices to send and/or receive data (e.g., text messages, media content, voice calls) to digital mobile radio devices. Moreover, the digital mobile radio messaging gateway provides transparent messaging access from devices to digital mobile radio switches and/or gateways essentially making the cellular network an extension of the digital mobile radio network. As an example, the digital mobile radio messaging gateway converts data received from the digital mobile radio network to a message that conforms to a protocol supported by the cellular network. Similarly, the digital mobile radio messaging gateway converts data received from the cellular network to a message that conforms to a protocol supported by the digital mobile radio network.

20 Claims, 13 Drawing Sheets

DIGITAL MOBILE RADIO CELLULAR MESSAGING

TECHNICAL FIELD

The subject disclosure relates to wireless communications and, more particularly, to digital mobile radio cellular messaging, e.g., employing a digital mobile radio cellular messaging gateway.

BACKGROUND

Digital mobile radio is a communication standard developed by the European telecommunications standards institute, which enables communication between field radio communications systems and/or devices. Typically, digital mobile radio communication is utilized by mission critical devices in scenarios wherein two-way communications are critical and/or communication services which do not rely on cellular carriers are needed. For example, the digital mobile radio standard allows radio transmissions in the 12.5 kHz (kilohertz) band and provides voice and data services using time division multiple access. For further background, the digital mobile radio standard includes digital mobile radio tiers that facilitate communication in both a licensed conventional mode operation (known as digital mobile radio tier II) and a licensed trunked mode operation (known as digital mobile radio tier III).

DETAILED DESCRIPTION

Figure 1:
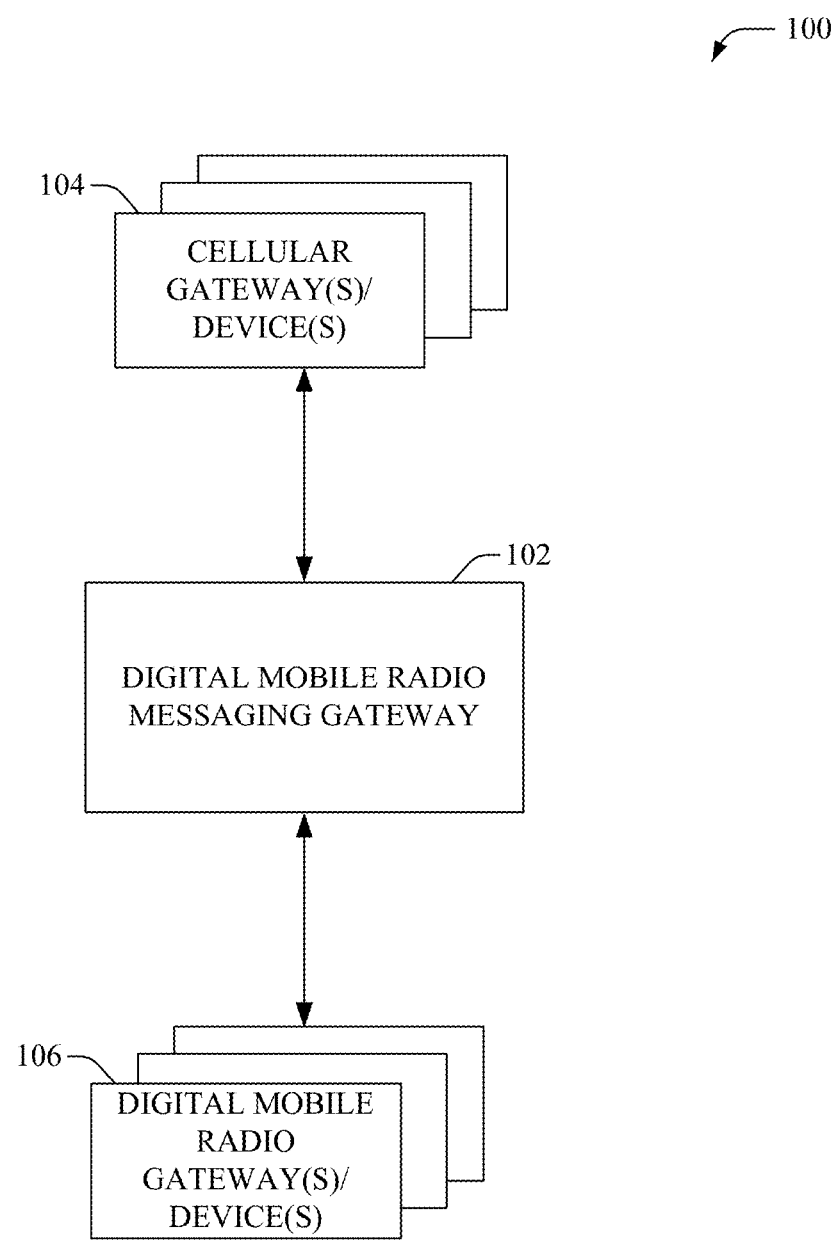
FIG. 1 illustrates an example system that facilitates communication between cellular and digital mobile radio networks.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," "platform," "center," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "cellular device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Digital mobile radio devices are widely employed by electric utilities to communicate with field crews particularly in times of natural disasters. Electric utilities utilize two-way radios, for example, digital mobile radios, to communicate with field crews via a privately owned digital mobile radio communication network. Utilities field crews often carry multiple devices including digital mobile radios and cellular phones; however, both devices are unable to communicate with each other. Aspects disclosed herein provide a system and method that allow digital mobile radio devices to communicate with cellular devices in effect making the cellular network an extension of the utilities digital mobile radio network and vice versa. Moreover, the systems and method disclosed herein allow utility companies to use their existing investment in digital mobile radio devices and at the same time, allow field crews to communicate with a mobile cellular network.

Aspects or features of the disclosed subject matter can be exploited in substantially any wired or wireless communication technology; e.g., universal mobile telecommunications system, Wi-Fi, worldwide interoperability for microwave access, general packet radio service, enhanced general packet radio service, global system for mobile communications, third generation partnership project long term evolution, third generation partnership project 2 ultra mobile broadband, high speed packet access, Zigbee, or another IEEE 802.XX technology. Additionally, substantially all aspects of the disclosed subject matter can be exploited in legacy (e.g., wireline) telecommunication technologies.

Referring initially to FIG. 1, there illustrated is an example system 100 that facilitates communication between cellular and digital mobile radio networks, according to one or more aspects of the disclosed subject matter. System 100 can include a digital mobile radio messaging gateway 102 that interfaces cellular gateway(s)/device(s) 104 with digital mobile radio gateway(s)/device(s) 106. In one aspect, cellular gateway(s)/device(s) 104 can be deployed within a public cellular network (e.g., universal mobile telecommunications system, global system for mobile communications, general packet radio service, third generation partnership project, long term evolution system, etc.) that facilitates communication between two or more user devices subscribed to the cellular network. As an example, the cellular gateway(s)/device(s) 104 can include (but are not limited to) a short message service center, a serving general packet radio service support node, a gateway general packet radio service support node, a packet data network gateway, etc. Moreover, the cellular gateway(s)/device(s) 104 can be part of most any public telecommunication network (wired and/or wireless) provided by a service provider.

According to an aspect, the digital mobile radio gateway(s)/device(s) 106 can include most any gateways or devices within a private digital mobile radio network. As an example, the private digital mobile radio network is a privately owned communication network employed by entities such as, but not limited to, utilities, government agencies, emergency services, (e.g., police forces, fire departments, ambulance), and/or transportation companies etc. The digital mobile radio network facilitates communication between digital mobile radio devices (e.g., two-way radios) based on an Internet protocol-based digital mobile radio standard specified for professional mobile radio users within an enterprise and developed by the European telecommunications standards institute. The digital mobile radio standard employed by the digital mobile radio network can include an unlicensed (Tier I), a licensed conventional (Tier II) and/or a licensed trunked (Tier III) mode of operation. In one example, the digital mobile radio standard can allow radio transmissions in the 12.5 kHz (kilohertz) band and can provide voice and/or data services using time division multiple access. Moreover, time division multiple access divides a channel width into alternating time slots that are allocated to different calls/data sessions during the radio transmission. It can be noted that, the subject specification is not limited to employing time division multiple access during radio transmissions. However, utilization of time division multiple access provides several advantages, such as but not limited to, lower equipment costs, longer battery life, increased spectral efficiency, etc. In one example, digital mobile radio networks provide wide area coverage and employ a dedicated channel or trunking system targeted to provide robust coverage rather than capacity.

The digital mobile radio messaging gateway 102 can allow mobile cellular devices to send and/or receive data (e.g., text messages and/or voice calls) directly to digital mobile radio devices (e.g., two-way radios). Moreover, the digital mobile radio messaging gateway 102 can provide transparent messaging access from mobile cellular devices to digital mobile radio switches and gateways. In one aspect, the digital mobile radio messaging gateway 102 can facilitate routing messages received from the cellular gateway(s)/device(s) 104 to the digital mobile radio gateway(s)/device(s) 106 (or vice versa). As an example, the digital mobile radio messaging gateway 102 can facilitate address mapping, protocol conversion/translation, and/or encryption during the routing. Additionally or alternatively, the digital mobile radio messaging gateway 102 can store digital mobile radio device profile data associated with field devices coupled to the digital mobile radio network. As an example, the digital mobile radio device profile data can include information regarding a field device such as (but not limited to) internet protocol address, routing codes (e.g., that identify a digital mobile radio gateway to which the field device is coupled), and/or security profiles.

Figure 2:
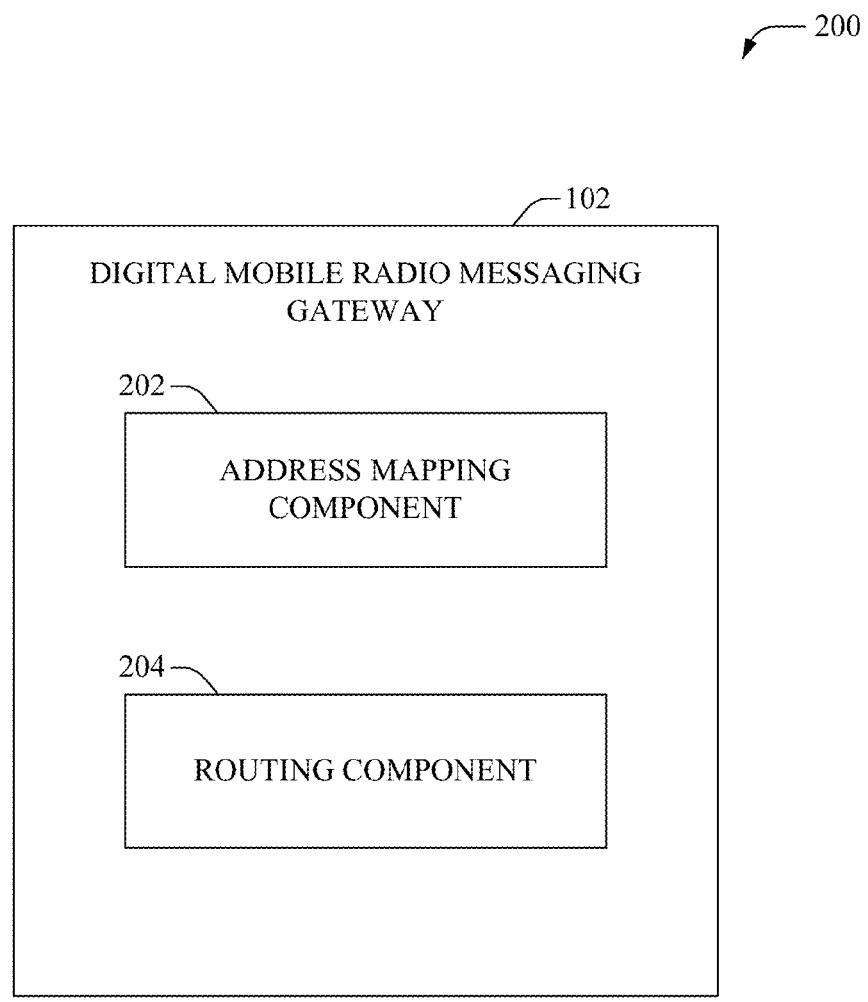
FIG. 2 illustrates an example system that facilitates interfacing a cellular network with one or more digital mobile radio networks.

Referring now to FIG. 2, there illustrated is an example system 200 that facilitates interfacing a cellular network with one or more digital mobile radio networks, in accordance with an aspect of the subject disclosure. Digital mobile radio networks are private networks employed to provide mission critical voice, dispatching and/or management capacity across various geographic areas. Moreover, digital mobile radio networks can include a set of digital mobile radio gateways, switches and/or servers coupled together via an internet protocol and/or internet protocol-based network. Further, the set of digital mobile radio gateways are coupled to mobile digital mobile radio devices via a wireless radio access network of the digital mobile radio network. In one aspect, the radio access network of the digital mobile radio network can employ a single 12.5 kHz channel to support two simultaneous and independent calls using time division multiple access. Under the digital mobile radio standard, time division multiple access retains the 12.5 kHz channel width and divides it into two alternating timeslots wherein each timeslot acts as a separate communication path. In one aspect, the digital mobile radio messaging gateway 102 can couple one or more cellular gateways/servers with one or more digital mobile radio gateways/servers. It is noted that the digital mobile radio messaging gateway 102 can include functionality as more fully described herein, for example, as described above with regard to system 100.

In one aspect, the digital mobile radio messaging gateway 102 can include an address mapping component 202 that receives data (e.g., a text message) from a cellular gateway (e.g., short message service center) and facilitates mapping/translation/encapsulation/conversion of the data to a format/protocol supported by the digital mobile radio network. Similarly, the address mapping component 202 can also receive data (e.g., a text message) from a digital mobile radio gateway and facilitate mapping/translation/encapsulation/conversion of the data to a format/protocol supported by the cellular network. As an example, a short message service message directed to a digital mobile radio device can be received by the address mapping component 202 from a short message service center within the cellular network via a short message peer-to-peer protocol. The address mapping component can 202 can convert (e.g., based on address mapping, translation, encapsulation/decapsulation, etc.) the short message service message to a message that conforms to an Internet protocol supported by the digital mobile radio network. Further, in another example, the address mapping component 202 can also receive, from the digital mobile radio network, an Internet protocol transmission that is directed to a cellular device and convert (e.g., based on address mapping, translation, encapsulation/decapsulation, etc.) the Internet protocol transmission to a short message service message that conforms to the short message peer-to-peer protocol.

Further, the digital mobile radio messaging gateway 102 can also include a routing component 204 that facilitates routing of data between the cellular network and the digital mobile radio network. Moreover, the routing component 204 can analyze data received from the cellular gateway and/or the digital mobile radio gateway to determine a route for the data. For example, based on a destination address/identifier within a message (e.g., within a header and/or body of the message) received from the cellular gateway, the routing component 204 can determine a routing code to select a digital mobile radio gateway to which the message is to be routed. Similarly, based on a destination address/identifier within a message received from the digital mobile radio gateway, the routing component 204 can determine a cellular gateway to which the message is to be routed (e.g., by querying a subscriber data store within the cellular network). Further, the routing component 204 can facilitate transmission of the data (e.g., conformed to an appropriate protocol by the address mapping component 202) based on the determined route information.

Figure 3:
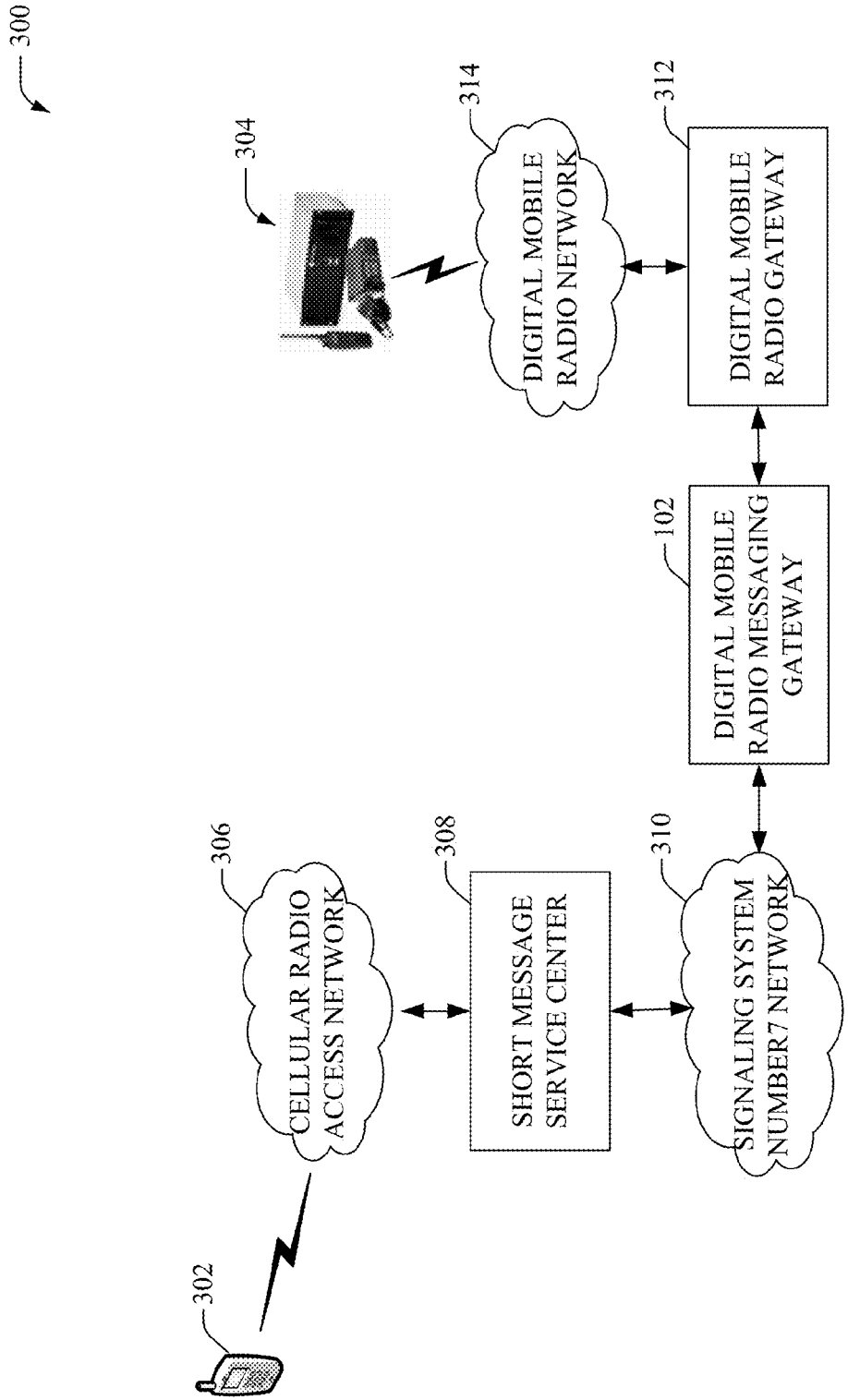
FIG. 3 illustrates an example system that facilitates a transfer of a short message service message between a cellular network and a digital mobile radio network.

Referring now to FIG. 3, there illustrated is an example system 300 that facilitates a transfer of a short message service message between a cellular network and a digital mobile radio network, according to an aspect of the subject disclosure. In one aspect, a digital mobile radio messaging gateway 102 can be employed to enable user equipment (UE) 302 to send and/or receive messages directly to/from digital mobile radio devices 304. Typically, UE 302 can include most any electronic communication device such as, but not limited to, most any consumer electronic device, for example, a tablet computer, a digital media player, a digital photo frame, a digital camera, a cellular phone, a personal computer, a personal digital assistant, a smart phone, a laptop, a gaming system, etc. Further, UE 302 can also include, for example, long term evolution-based devices, such as, but not limited to, most any home or commercial appliance that includes a long term evolution radio. It can be noted that UE 302 can be mobile, have limited mobility and/or be stationary.

Further, digital mobile radio devices 304 can also include most any electronic communication device, such as, but not limited to portable/mobile two-way radios, repeater stations, base stations, controllers, etc. As an example, digital mobile radio devices 304 can include most any electronic device that facilitates communication via the digital mobile radio standard (Tier I, II, and/or III) and can be deployed within various industries/organizations, such as, but not limited to utilities (e.g., electric, water, and/or gas service providers), transport (e.g., bus, taxi, airport, rail, and/or freight services) and/or most any private access mobile radio operators. It is noted that the digital mobile radio messaging gateway 102 can include functionality as more fully described herein, for example, as described above with regard to systems 100 and 200.

In one aspect, the UE 302 can communicate with the cellular network via a radio access network 306. As an example, the cellular radio access network 306 can include one or more access points, controllers, gateways and/or servers. In one aspect, the UE 302, for example, on power-on or on entering a coverage area of the cellular network, can perform an authentication with the cellular network that authorizes the UE 302 to communicate via the cellular network. According to an embodiment, text messages, for example, short message service messages, sent by UE 302 can be routed to the intended digital mobile radio device 304 by the digital mobile radio messaging gateway 102. For example, a short message service message can be created (e.g., via an input interface on the UE 302) and transmitted to a short message service center 308 via the cellular radio access network 306. In one aspect, short message service center 308 can determine that the short message service message is directed to a digital mobile radio device 304 (and not to a cellular device), for example, based on destination address/identifier associated within the short message service message. In response, the short message service center 308 can forward the message to the digital mobile radio messaging gateway 102 via a signaling system number 7 network 310.

The digital mobile radio messaging gateway 102 can receive the short message service message transmitted by the short message service center by employing a signaling system number 7 protocol (or short message peer-to-peer protocol) and convert the short message service message to an Internet protocol message that conforms to the Internet protocol employed by the digital mobile radio network (e.g., by employing the address mapping component 202). Further, based on the destination address/identifier, the digital mobile radio messaging gateway 102 can determine a digital mobile radio gateway 312 to which the digital mobile radio device 304 is connected (e.g., by employing the routing component 204). For example, the digital mobile radio messaging gateway 102 can receive (e.g., periodically, on demand, in response to an event, etc.), routing data from one or more digital mobile radio gateways (including digital mobile radio gateway 312) that includes routing codes associated with the digital mobile radio gateways and identifier data (e.g., electronic serial numbers) of digital mobile radio devices coupled to the digital mobile radio gateways. Accordingly, based on the identifier data received from the short message service message, the digital mobile radio messaging gateway 102 (e.g., by employing the routing component 204) can identify the digital mobile radio gateway 312 to which the Internet protocol message is to be routed.

In one aspect, a digital mobile radio gateway 312 can include most any gateway/server deployed within the digital mobile radio network 314 that manages transmissions to/from one or more digital mobile radio devices, base stations, repeaters, etc. The digital mobile radio gateway 312 delivers the Internet protocol message to the digital mobile radio device 304 via the digital mobile radio network 314 by employing time division multiple access protocol. Specifically, the protocols employed by the digital mobile radio network are defined in ETSI TS 102 361-1 V2.1.1: "Electromagnetic compatibility and Radio spectrum Matters (ERM); Digital Mobile Radio (DMR) Systems; Part 1: DMR Air Interface (AI) protocol," (2012-04); ETSI TS 102 361-2 V1.2.6: "Electromagnetic compatibility and Radio spectrum Matters (ERM); Digital Mobile Radio (DMR) Systems; Part 2: DMR voice and generic services and facilities," (2007-12); ETSI TS 102 361-3 V1.1.7 "Electromagnetic compatibility and Radio spectrum Matters (ERM); Digital Mobile Radio (DMR) Systems; Part 3: DMR Data protocol," (2007-12); and ETSI TS 102 361-4 V1.2.1 "Electromagnetic compatibility and Radio spectrum Matters (ERM); Digital Mobile Radio (DMR) Systems; Part 4: DMR trunking protocol," (2006-09), the entireties of which are incorporated by reference herein. As an example, the digital mobile radio network 314 can support various versions of the Internet protocol (e.g., Internet protocol version 4 and/or Internet protocol version 6). Further, the air interface protocol supported by a radio access network of the digital mobile radio network 314 can be built around a 30 ms (millisecond) slot structure with a 50% duty cycle, wherein the protocol calls for the unit to be receiving in the spaces between the transmitted blocks and thus allows signaling and/or voice in the reverse direction even during a conversation. In an example, the digital mobile radio network 314 can employ is a 2-slot time division multiple access channel for both the inbound and outbound channels. Although not explicitly illustrated within FIG. 3, it can be noted that the digital mobile radio network 314 can include one or more access points, controllers, gateways, servers, and/or data stores.

According to an aspect, the digital mobile radio device 304 can acknowledge receipt of the Internet protocol message received from the digital mobile radio messaging gateway 102, and the acknowledgement data can be transferred to the short message service center 308 by the digital mobile radio messaging gateway 102. Moreover, the digital mobile radio messaging gateway 102 can receive the acknowledgement data via the Internet protocol and conform the data to an signaling system number 7 (or short message peer-to-peer) protocol prior to transferring the data to the short message service center 308. The short message service center 308 can employ the acknowledgement data to transmit a delivery report to the UE 302 indicative of delivery of the short message service message. Alternatively, if the acknowledgement data is not received within a predefined time interval, the digital mobile radio messaging gateway 102 can transmit, to the short message service center 308, a notification indicative of a failure to deliver the message. Accordingly, the short message service center 308 can employ the acknowledgement data to transmit a failure notification to the UE 302.

According to an embodiment, the system 300 can also facilitate transmission of short message service messages from the digital mobile radio device 304 to the UE 302. In this example scenario, the digital mobile radio device 304 can transmit, via an Internet protocol, a text message to the digital mobile radio gateway 312. The digital mobile radio gateway 312 can analyze the message to determine that the message is directed to a cellular device (e.g., UE 302) and accordingly, transfer the message to the digital mobile radio messaging gateway 102 (by employing the Internet protocol). The digital mobile radio messaging gateway 102 can conform the message to the signaling system number 7 (or short message peer-to-peer) protocol and direct the message to the short message service center 308 via the signaling system number 7 network 310. The short message service center 308 can then deliver the message to the UE 302. Additionally or optionally, the short message service center 308 can transfer a delivery report to the digital mobile radio device 304 via the digital mobile radio messaging gateway 102 to indicate that the message has been delivered (or a failure report indicative that the message was not delivered). Moreover, the digital mobile radio messaging gateway 102 can receive the delivery report (or failure report) via the signaling system number 7 (or short message peer-to-peer) protocol and conform the report data to an Internet protocol prior to transferring the report data to the digital mobile radio gateway 312. Although only one digital mobile radio gateway 312 is illustrated, it can be noted that the digital mobile radio messaging gateway 102 can couple a cellular gateway (e.g., short message service center, serving general packet radio service support node, gateway general packet radio service support node, serving gateway, packet data network gateway, etc.) with multiple digital mobile radio gateways deployed within the same or different digital mobile radio networks, for example, owned/managed/operated by one or more private entities/organizations/businesses.

Figure 4A:
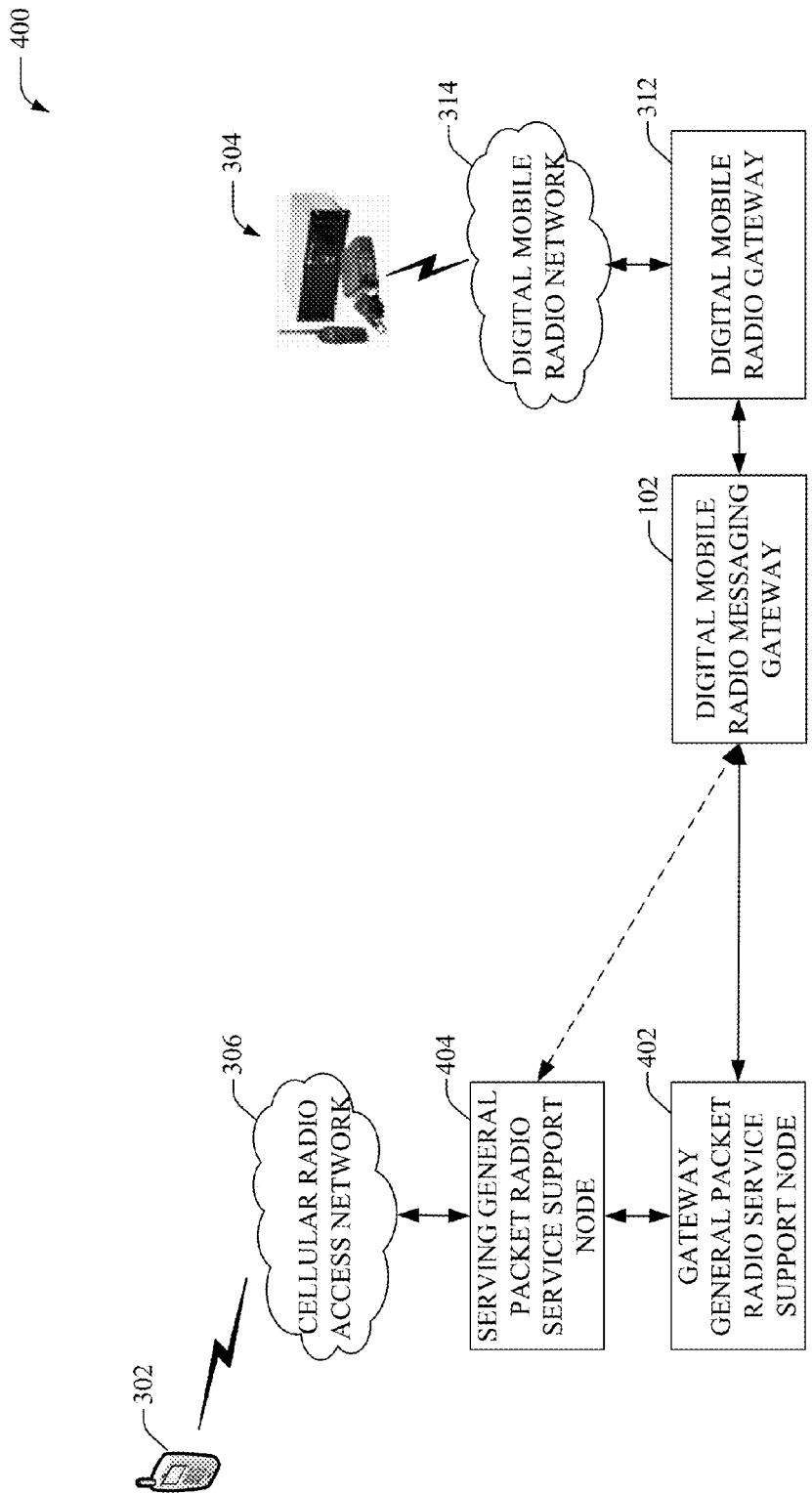
FIGS. 4A-4B illustrate example systems that facilitate a transmission of text messages between cellular devices and digital mobile radio devices.
Figure 4B:
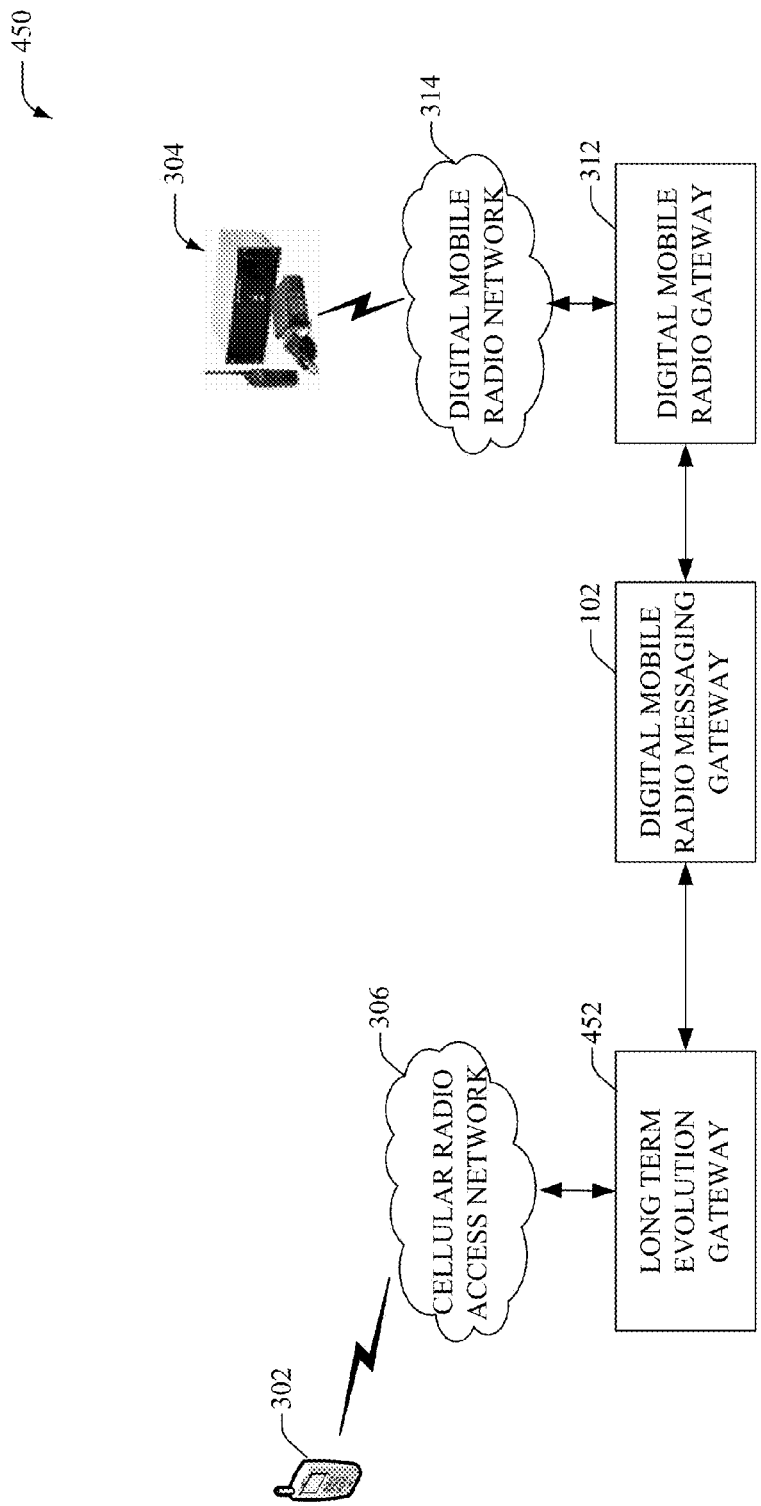

FIGS. 4A-4B illustrates example systems (400, 450) that facilitate a transmission of text messages between cellular devices and digital mobile radio devices according to an aspect of the disclosed subject matter. The digital mobile radio messaging gateway 102, UE 302, digital mobile radio device 304, cellular radio access network 306, digital mobile radio gateway 312, and digital mobile radio network 314 can include functionality as more fully described herein, for example, as described above with regard to systems 100-300.

Referring now to system 400 that illustrates a digital mobile radio messaging gateway 102 coupled to a gateway general packet radio service support node 402 (and/or serving general packet radio service support node 404). The digital mobile radio messaging gateway 102 facilitates routing Internet protocol transmissions originating from the digital mobile radio device 304 to a user equipment 302 and vice versa. As an example, a message created on the digital mobile radio device 304 can include destination identifier data (e.g., mobile station international subscriber directory number associated with UE 302, routing code, Internet protocol address, etc.). The message can then be transmitted via the digital mobile radio network 314 to a digital mobile radio gateway 312. The digital mobile radio gateway determines, based on the destination identifier data, that the message is directed to the UE 302 that is coupled to a cellular network. Thus, digital mobile radio gateway 312 can forward the message to the digital mobile radio messaging gateway 102, which identifies a route for the message based on querying a network data store (e.g., home subscriber server, home location register, visitor location register). Moreover, the digital mobile radio gateway 312 can identify a gateway general packet radio service support node 402 (and/or serving general packet radio service support node 404) and transmit the message to the gateway general packet radio service support node 402 (and/or serving general packet radio service support node 404) to facilitate delivery of the message to the UE 302. In one example, the digital mobile radio messaging gateway 102 can perform address mapping and/or protocol translation to ensure that the message conforms to a protocol supported by the gateway general packet radio service support node 402 (and/or serving general packet radio service support node 404).

Similarly, when the message is transmitted from the UE 302 to the digital mobile radio device 304, initially the message is transmitted by the UE 302 to the digital mobile radio messaging gateway 102 via the gateway general packet radio service support node 402 (and/or serving general packet radio service support node 404). In one aspect, the gateway general packet radio service support node 402 (and/or serving general packet radio service support node 404) can determine (e.g., based on destination address data) that the message is intended for a device within a digital mobile radio network and can accordingly forward the message to the digital mobile radio messaging gateway 102. Based on destination address data associated with the digital mobile radio device 304, the digital mobile radio messaging gateway 102 selects a digital mobile radio gateway 312 to which the message can be routed. In one example, the digital mobile radio messaging gateway 102 can perform address mapping and/or protocol translation to ensure that the message conforms to the Internet protocol supported by the digital mobile radio gateway 312 and can facilitate delivery of the message to the digital mobile radio device 304 via the digital mobile radio gateway 312.

FIG. 4B illustrates an example system 450 that facilitates communication between a long term evolution network and a digital mobile radio network 314. The long term evolution network includes an long term evolution gateway 452, such as (but not limited to) serving gateway and/or packet data network gateway that receives a text message from UE 302 and determines (e.g., based on destination data) that the text message is directed to a digital mobile radio device 304 (e.g., a communication device that is coupled to a digital mobile radio network 314). Moreover, the long term evolution gateway 452 transmits the message to the digital mobile radio messaging gateway 102, which in turn identifies a digital mobile radio gateway 312 to which the message is to be routed. In one example, the digital mobile radio messaging gateway 102 can perform address mapping and/or protocol translation to ensure that the message conforms to the Internet protocol supported by the digital mobile radio gateway 312 and can facilitate delivery of the message to the digital mobile radio device 304 via the digital mobile radio gateway 312.

In one aspect, a message created on the digital mobile radio device 304 can be transmitted via the digital mobile radio network 314 to the digital mobile radio gateway 312. The digital mobile radio gateway 312 determines, based on the destination address data, that the message is directed to the UE 302 and accordingly forwards the message to the digital mobile radio messaging gateway 102. The digital mobile radio messaging gateway 102 can determine a route for the message, for example, based on querying a network data store (e.g., home subscriber server, home location register, visitor location register, etc.) of the cellular network. Moreover, the digital mobile radio gateway 312 can identify the long term evolution gateway 452 and transmit the message to the long term evolution gateway 452 to facilitate delivery of the message to the UE 302. In one example, the digital mobile radio messaging gateway 102 can perform address mapping and/or protocol translation to ensure that the message conforms to a protocol supported by the long term evolution gateway 452. It can be noted that, the digital mobile radio messaging gateway 102 can also facilitate communication of a delivery report (or failure report) associated with the transmission of the message between the cellular and digital mobile radio networks of system 400 and 450.

Figure 5:
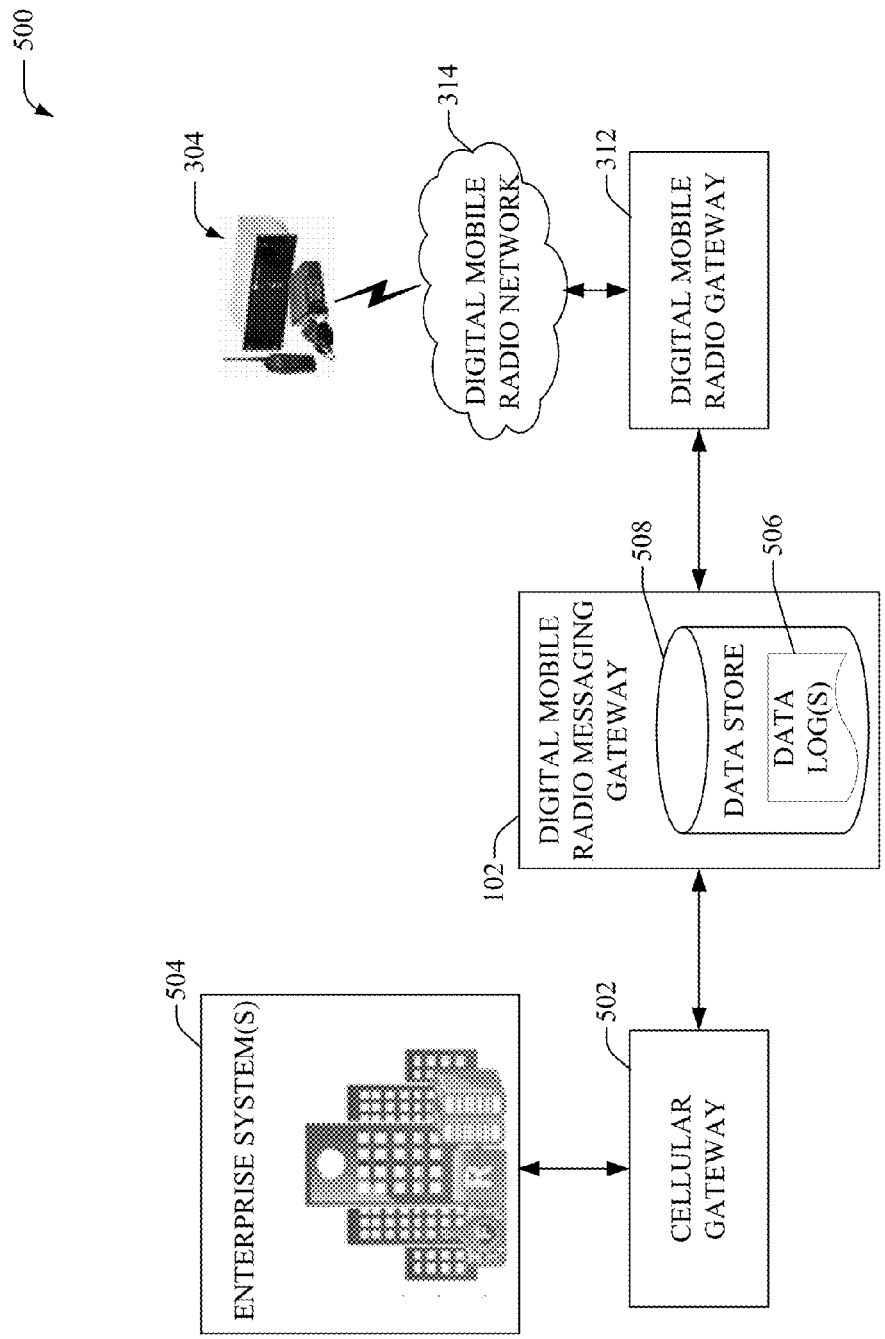
FIG. 5 illustrates an example system that facilitates management of communication between a cellular network and a digital mobile radio network.

Referring now to FIG. 5, there illustrated is an example system 500 that facilitates management of communication between a cellular network and a digital mobile radio network, according to one or more aspects of the disclosed subject matter. System 500 includes a digital mobile radio messaging gateway 102 that interfaces a cellular gateway 502 (e.g., serving general packet radio service support node, gateway general packet radio service support node, serving gateway, packet data network gateway, email server, content/media server, etc.) with a digital mobile radio gateway 312 to facilitate communication between a cellular device (e.g., UE 302) and a digital mobile radio device 304. Further, in one aspect, the digital mobile radio messaging gateway 102 can communicate with an enterprise system(s) 504 (e.g., a utilities enterprise system) associated with the digital mobile radio network 314. As an example, the digital mobile radio messaging gateway 102 can receive management data from the enterprise system(s) 504 that controls operation of the digital mobile radio messaging gateway 102. The digital mobile radio messaging gateway 102, digital mobile radio device 304, digital mobile radio gateway 312, and digital mobile radio network 314 can include functionality as more fully described herein, for example, as described above with regard to systems 100-450.

The enterprise system(s) 504 can include (but are not limited to) enterprise planning systems and/or business intelligence systems deployed by an organization associated with (e.g., that owns, manages, operates, etc.) the digital mobile radio network 314. In one aspect, the enterprise system(s) 504 can connect to the cellular gateway 502 via most any communication network, such as, but not limited to an Internet protocol-based network (e.g., Internet). In one example, the communication between the enterprise system(s) 504 and the cellular gateway 502 and/or the digital mobile radio messaging gateway 102 can be secured and/or encrypted (e.g., by employing Internet protocol Security protocol). In another example, Frame Relay and/or Internet protocol-enabled Frame Relay can be utilized to transmit the communication. In yet another example, virtual private networks (e.g., multiprotocol label switching-based virtual private networks) can be employed to secure the communication. Further, the digital mobile radio messaging gateway 102 can verify authorization of the enterprise system(s) 504 prior to receiving the management data.

In one aspect, enterprise system(s) 504 can provide the digital mobile radio messaging gateway 102 with one or more policies and/or preferences, such as, but not limited to operating policies/preferences, security policies/preferences, routing policies/preferences, data logging policies/preferences, etc. Moreover, based on the policies and/or preferences (e.g., data logging policies/preferences), the digital mobile radio messaging gateway 102 can record data logs 506 associated with messages routed between the cellular gateway 502 and the digital mobile radio gateway 312. As an example, the data log 506 can include (but is not limited to) information related to a time at which the message is sent/delivered, size of message, source device, destination device, message content, etc. The digital mobile radio messaging gateway 102 can store the data logs 506 within a data store 508. As an example, the data logs 506 can be delivered (e.g., periodically, on demand, in response to an event, when network traffic is below a predefined threshold, etc.) to the enterprise system(s) 504, which in turn can analyze the data logs 506 to facilitate management, planning, and/or auditing.

It is noted that the data store 208 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Figure 6:
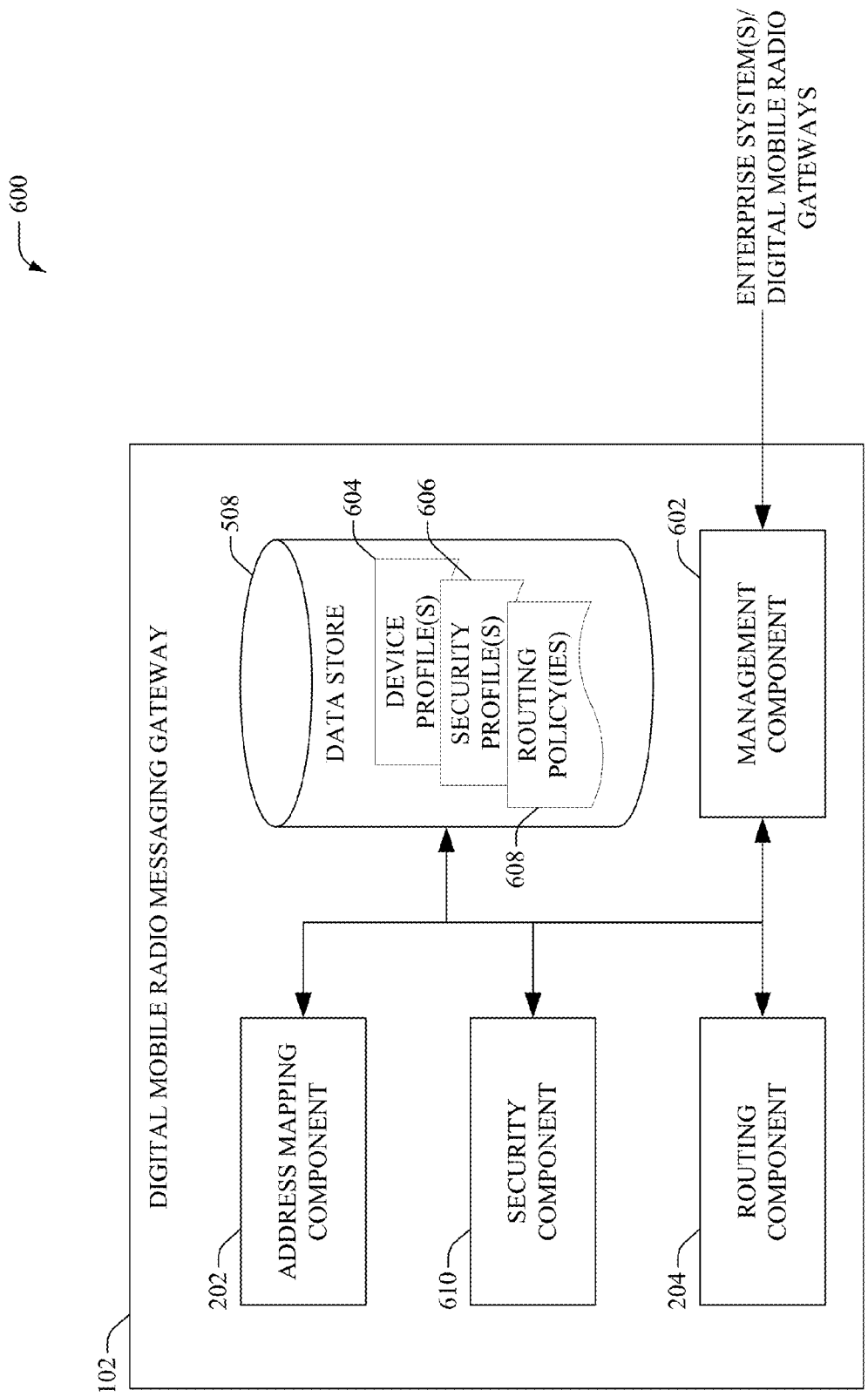
FIG. 6 illustrates an example system that includes a front-end gateway that facilitates routing of data between a cellular network and a digital mobile radio network.

Referring now to FIG. 6, there illustrated is an example system 600 that includes a front end gateway that facilitates routing of data between a cellular network and a digital mobile radio network, in accordance with an aspect of the subject disclosure. It is noted that the digital mobile radio messaging gateway 102, address mapping component 202, routing component 204, and data store 508 can include functionality as more fully described herein, for example, as described above with regard to systems 100-500.

In one aspect, the digital mobile radio messaging gateway 102 can include a management component that receives and stores management data within the data store 508. As an example, the management data can include (but is not limited to) device profile(s) 604, security profile(s) 606, and/or routing policy(ies) 608. In one aspect, the management data can be received (e.g., during provisioning of the digital mobile radio messaging gateway 102, periodically, on demand, in response to an event, when network traffic is below a predefined threshold, etc.) from the enterprise system 504 and/or a digital mobile radio gateway 312. As an example, the digital mobile radio gateway 312 can communicate with the management component via an Internet protocol network and provide device profile(s) 604 associated with digital mobile radio devices coupled to the digital mobile radio gateway 312. The device profile(s) 604 can include (but is not limited to) address information (e.g., Internet protocol address or codes) associated with a digital mobile radio device that can be utilized by the digital mobile radio messaging gateway 102 to facilitate translation and/or routing of the messages between the cellular and digital mobile radio networks. Further, the device profile(s) 604 can include information indicative of a routing code that facilitates selection of digital mobile radio gateway 312 during the routing.

The security profile(s) 606 can include access restriction data that can be received from the enterprise system 504 (and/or a digital mobile radio network device). The access restriction data can specify whether a digital mobile radio device can be publicly accessed or can be accessed only by a specified a list of cellular devices. Moreover, the security profile(s) 606 can include identifier data indicative of the list of cellular devices. Further, the security profile(s) 606 can include information that specifies a type of message (e.g., short message service, multimedia message service, email, etc.) that can be sent to/received from the digital mobile radio device and/or size and/or content restrictions associated with the message.

In one aspect, the security component 610 can enforce the access restrictions when data is to be routed between the cellular network and the digital mobile radio network by the digital mobile radio messaging gateway 102. Moreover, the security component 610 can authenticate the source/destination device and/or determine whether routing of the data is permitted based on the access restrictions. Accordingly, the security component 610 can allow or deny routing of the data. Additionally or optionally, the security component 610 can employ most any encryption/decryption technique to securely transfer the data. In one example, if it is determined that the routing of the data is permitted (e.g., by the security component 610), the routing component 204 can facilitate routing of the data based on one or more routing policies 608 stored within the data store 508. Further, the security component 610 can authorize entities, such as but not limited to the enterprise system(s) 504 and/or the digital mobile radio gateways 312, that access and/or modify information stored within the data store 508.

Figure 7:
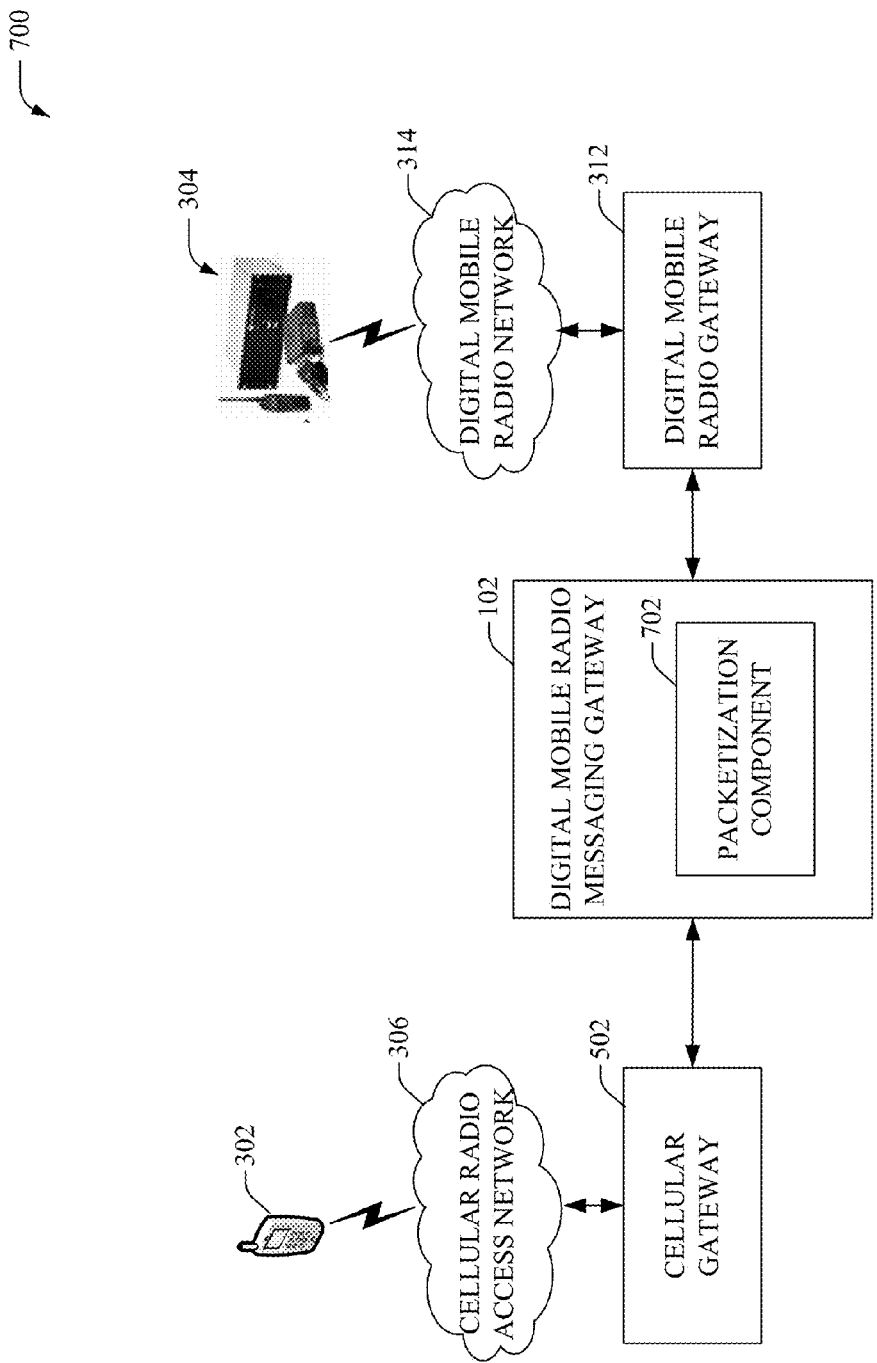
FIG. 7 illustrates an example system that facilitates routing a voice call between a cellular device and a digital mobile radio device.

Referring now to FIG. 7, there illustrated is an example system 700 that facilitates routing a voice call between a cellular device and a digital mobile radio device, in one aspect of the subject disclosure. System 700 enables user equipment 302, coupled to a cellular network, to communicate with digital mobile radio devices 304 (e.g., two-way radios). The bridging of these two networks (cellular and digital mobile radio networks) provides a powerful incentive for utilization of the mobile cellular system as an extension of digital mobile radio networks. It is noted that the digital mobile radio messaging gateway 102, UE 302, digital mobile radio device 304, cellular radio access network 306, digital mobile radio gateway 312, digital mobile radio network 314, and cellular gateway 502 can include functionality as more fully described herein, for example, as described above with regard to systems 100-600.

According to an embodiment, the digital mobile radio messaging gateway 102 can include a packetization component 702 that convert Internet protocol transmissions that reach the cellular gateway 502 (from UE 302) into protocols that supported by the digital mobile radio gateway 312. Accordingly, a user can employ UE 302 to establish a voice call with one or more digital mobile radio devices 304, for example, by entering the appropriate routing number into the UE 302. In one aspect, the digital mobile radio messaging gateway 102 can receive from the cellular gateway 502 Internet protocol data packets associated with the voice call, determine that the call is directed to a digital mobile radio device 304, select the digital mobile radio gateway 312 to which the Internet protocol data packets are to be routed, and forward the Internet protocol data packets to the digital mobile radio gateway 312 in the correct protocol for subsequent transmission to the digital mobile radio device 304. Moreover, the packetization component 702 can be employed to conform the data packets received from the cellular gateway 502 to a protocol supported by the digital mobile radio network.

Similarly, the digital mobile radio messaging gateway 102 can also facilitate establishment of a voice call that is initiated by the digital mobile radio device 304 and directed to the UE 302. As an example, the digital mobile radio device 304 can initiate the call by entering the appropriate routing code (e.g., mobile station international subscriber directory number) associated with UE 302. On determining that the call is directed to a cellular device, the digital mobile radio gateway 312 can subsequently route the transmission (Internet protocol data packets) to the digital mobile radio messaging gateway 102, which would in turn route the transmission back to the UE 302. As an example, the packetization component 702 can be employed to conform the data packets received from the digital mobile radio gateway 312 to a protocol supported by the cellular gateway 502.

Figure 8:
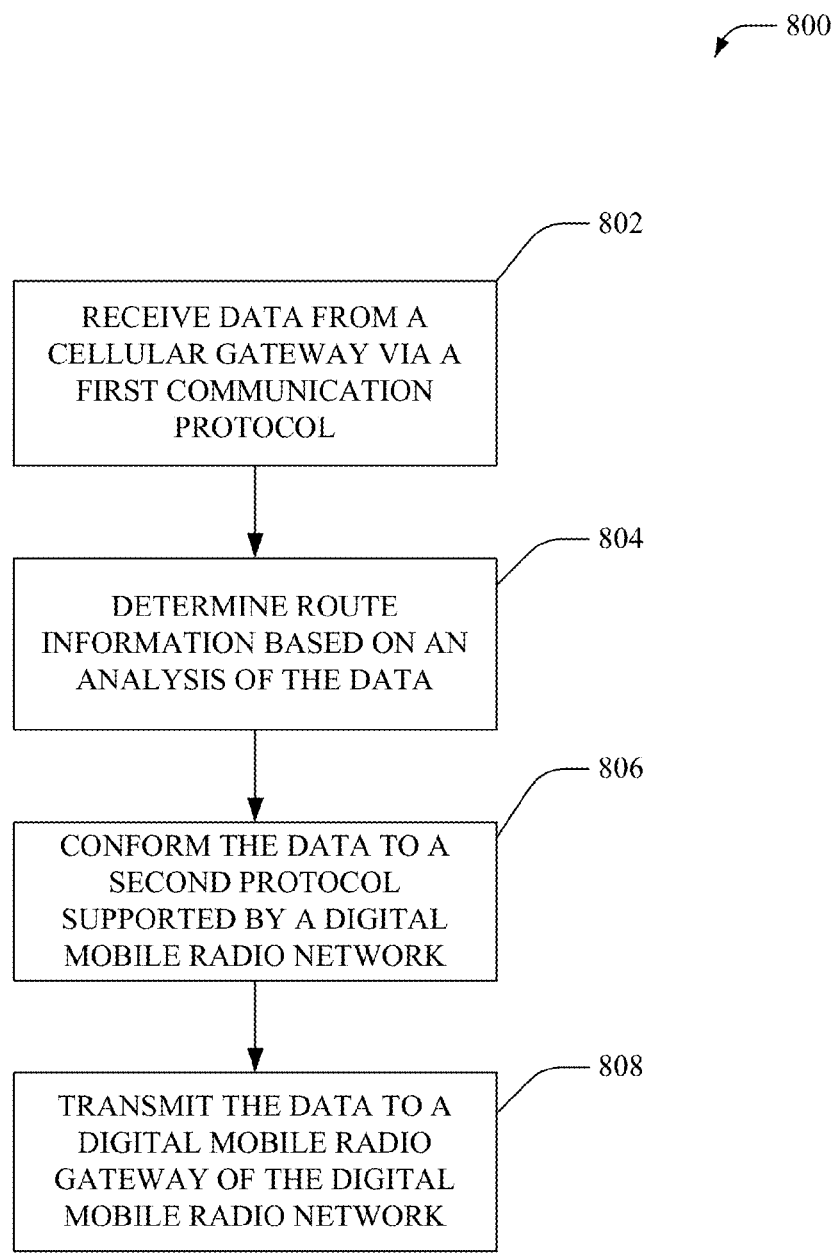
FIG. 8 illustrates an example method that facilitates transmission of data from a cellular device to a digital mobile radio device.
Figure 9:
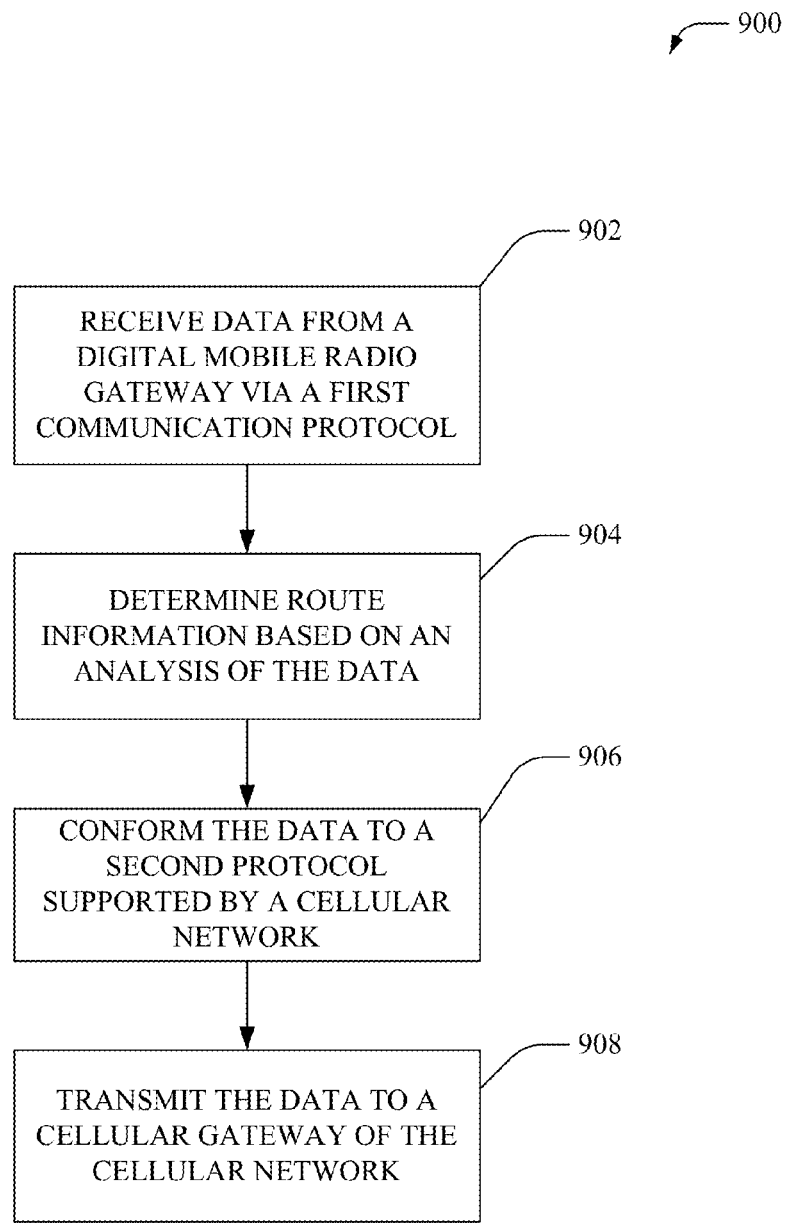
FIG. 9 illustrates an example method that facilitates transmission of data from a digital mobile radio device to a cellular device.

FIGS. 8-9 illustrate flow diagrams and/or methods in accordance with the disclosed subject matter. For simplicity of explanation, the flow diagrams and/or methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, illustrated is an example method 800 that facilitates transmission of data from a cellular device (e.g., UE 302) to a digital mobile radio device (e.g., two-way radio), according to an aspect of the subject disclosure. As an example, method 800 can be implemented to interface a telecommunication network with one or more digital mobile radio networks. Further, method 800 can facilitate an exchange of text messages (e.g., short message service, multimedia message service, email, etc.) and/or voice communication between the cellular and digital mobile radio devices.

At 802, data (e.g., text message and/or voice data) can be received (e.g., by the digital mobile radio messaging gateway 102) from a cellular gateway (e.g., short message service center, gateway general packet radio service support node, serving general packet radio service support node, serving gateway, packet data network gateway, etc.) via a first communication protocol (e.g., signaling system number 7, mobile application part, voice over Internet protocol, etc.). As an example, the cellular gateway can determine that the data received from a cellular device is directed to a digital mobile radio device and forward the data to a digital mobile radio messaging gateway. At 804, route information can be determined (e.g., by the routing component 204) based on an analysis of the data. For example, based on a destination address, route information for the data can be determined. Moreover, a digital mobile radio gateway to which the digital mobile radio device is currently coupled can be identified. Further, at 806 the data can be conformed (e.g., by the address mapping component 202) to a second communication protocol (e.g., Internet protocol) supported by the digital mobile radio network. As an example, most any protocol translation/mapping/conversion/encapsulation/decapsulation technique can be employed to conform the data to the second communication protocol. Furthermore, at 808, the conformed data can be transmitted (e.g., by the routing component 204) to the digital mobile radio gateway, which in turn can direct the data to the digital mobile radio device via the digital mobile radio network.

FIG. 9 illustrates an example method 900 that facilitates transmission of data from a digital mobile radio device (e.g., two-way radio) to a cellular device (e.g., UE 302), according to an aspect of the subject disclosure. As an example, method 900 can be implemented to interface a telecommunication network with one or more digital mobile radio networks. Further, method 900 can facilitate an exchange of text messages (e.g., short message service, multimedia message service, email, etc.) and/or voice communication between the cellular and digital mobile radio devices.

At 902, data (e.g., text message and/or voice data) can be received (e.g., by the digital mobile radio messaging gateway 102) from a digital mobile radio gateway deployed within a digital mobile radio network via a first communication protocol (e.g., Internet protocol). As an example, the digital mobile radio gateway can determine that the data received from a digital mobile radio device is directed to a cellular device coupled to a cellular network and can accordingly forward the data to a digital mobile radio messaging gateway. At 904, route information can be determined (e.g., by the routing component 204) based on an analysis of the data. For example, based on a destination address, route information for the data can be determined. Moreover, a cellular gateway (e.g., short message service center, gateway general packet radio service support node, serving general packet radio service support node, serving gateway, packet data network gateway, etc.) to which the cellular device is currently coupled can be identified, for example, by querying a network data store (e.g., home subscriber server, home location register, visitor location register, etc.) within the cellular network. Further, at 906, the data can be conformed (e.g., by the address mapping component 202) to a second communication protocol (e.g., signaling system number 7, mobile application part, voice over Internet protocol, etc.) supported by the cellular network. As an example, most any protocol translation/mapping/conversion/encapsulation/decapsulation technique can be employed to conform the data to the second communication protocol. Furthermore, at 908, the conformed data can be transmitted (e.g., by the routing component 204) to the cellular gateway, which in turn can direct the data to the cellular device via the cellular network.

Figure 10:
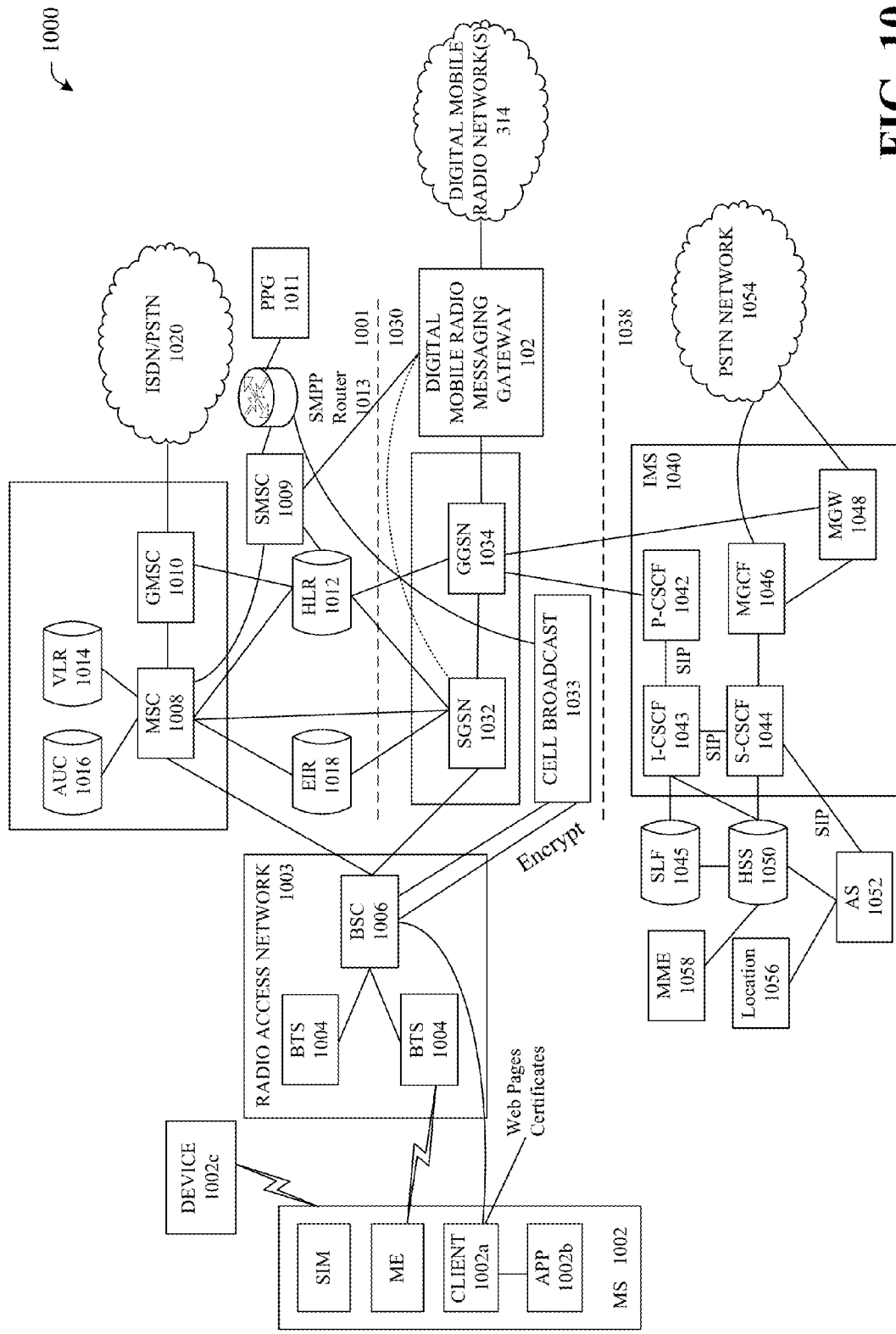
FIG. 10 illustrates a global system for mobile communications/general packet radio service/Internet protocol multimedia network architecture that can employ the disclosed architecture.

Now turning to FIG. 10, there is depicted an example global system for mobile communications/general packet radio service/Internet protocol multimedia network architecture 1000 that can employ the disclosed communication architecture. In particular, the global system for mobile communications/general packet radio service/Internet protocol multimedia network architecture 1000 includes a global system for mobile communications core network 1001, a general packet radio service network 1030 and an Internet protocol multimedia network 1038. The global system for mobile communications core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a subscriber identity module. The subscriber identity module includes an international mobile subscriber identity and/or mobile station international subscriber directory number, which is a unique identifier of a subscriber. The MS 1002 includes an embedded client 1002a that receives and processes messages received by the MS 1002. The embedded client 1002a can be implemented in JAVA and is discussed more fully below. It is noted that MS 1002 can be substantially similar to UE 302, and can include functionality described with respect to UE 302 in systems 300-450 and 700.

The embedded client 1002a communicates with an application 1002b that provides services and/or information to an end user. Additionally or alternately, the MS 1002 and a device 1002c can be enabled to communicate via a short-range wireless communication link, such as BLUETOOTH®. As one of ordinary skill in the art would recognize, there can be an unlimited number of devices 1002c that use the subscriber identity module within the MS 1002 to provide services, information, data, audio, video, etc. to end users.

The BTS 1004 is physical equipment, such as a radio tower, that enables a radio interface to communicate with the MS 1002. Each BTS can serve more than one MS. The BSC 1006 manages radio resources, including the BTS. The BSC 1006 can be connected to several BTSs. The BSC and BTS components, in combination, are generally referred to as a base station (BSS) or radio access network 1003. The radio access network 1003 can be substantially similar to cellular radio access network 306, and can include functionality described with respect to cellular radio access network 306 in systems 300-400 and 700.

The global system for mobile communications core network 1001 also includes a Mobile Switching Center (MSC) 1008, a Gateway Mobile Switching Center (GMSC) 1010, a home location register 1012, visitor location register 1014, an Authentication Center (AuC) 1018, and an Equipment Identity Register (EIR) 1018. The MSC 1008 performs a switching function for the network. The MSC also performs other functions, such as registration, authentication, location updating, handovers, and call routing. The GMSC 1010 provides a gateway between the global system for mobile communications network and other networks, such as an integrated services digital network or public switched telephone networks 1020. In other words, the GMSC 1010 provides interworking functionality with external networks.

The home location register 1012 is a database or component(s) that comprises administrative information regarding each subscriber registered in a corresponding global system for mobile communications network. The home location register 1012 also includes the current location of each MS. The visitor location register 1014 is a database or component(s) that contains selected administrative information from the home location register 1012. The visitor location register contains information necessary for call control and provision of subscribed services for each MS currently located in a geographical area controlled by the visitor location register. The home location register 1012 and the visitor location register 1014, together with the MSC 1008, provide the call routing and roaming capabilities of global system for mobile communications. The authentication center (AuC) 1016 provides the parameters needed for authentication and encryption functions. Such parameters allow verification of a subscriber's identity. The equipment identity register 1018 stores security-sensitive information about the mobile equipment. In one aspect, the authentication center 1016 performs a subscriber identity module authentication, in response to MS 1002, for example, powering-on and/or entering a coverage area of the BTS 1004. The subscriber identity module authentication allows the MS 1002 to communicate via the global system for mobile communications/general packet radio service/Internet protocol multimedia network.

A short message service center 1009 allows one-to-one short message service messages to be sent to/from the MS 1002. A push proxy gateway 1011 is used to "push" (e.g., send without a synchronous request) content to the MS 1002. The push proxy gateway 1011 acts as a proxy between wired and wireless networks to facilitate pushing of data to the MS 1002. A short message peer-to-peer protocol router 1013 is provided to convert short message service-based short message peer-to-peer messages to cell broadcast messages. Short message peer-to-peer is a protocol for exchanging short message service messages between short message service peer entities such as short message service centers. It is often used to allow third parties, e.g., content suppliers such as news organizations, to submit bulk messages. It is noted that the short message service center 1009 can be substantially similar to short message service center 308, and can include functionality described with respect to cellular short message service center 308 in system 300. Moreover, the short message service center 308 can be coupled to the digital mobile radio messaging gateway 102 that can include functionality as more fully described herein, for example, as described above with regard to systems 100-700.

To gain access to global system for mobile communications services, such as speech, data, and short message service, the MS 1002 first registers with the network to indicate its current location by performing a location update and international mobile subscriber identity attach procedure. The MS 1002 sends a location update including its current location information to the MSC/visitor location register, via the BTS 1004 and the BSC 1006. The location information is then sent to the MS's home location register. The home location register is updated with the location information received from the MSC/visitor location register. The location update also is performed when the MS moves to a new location area. Typically, the location update is periodically performed to update the database as location-updating events occur.

The general packet radio service network 1030 is logically implemented on the global system for mobile communications core network architecture by introducing two packet-switching network nodes, a serving general packet radio service support node 1032, a cell broadcast and a gateway general packet radio service support node 1034. The serving general packet radio service support node 1032 is at the same hierarchical level as the MSC 1008 in the global system for mobile communications network. The serving general packet radio service support node controls the connection between the general packet radio service network and the MS 1002. The serving general packet radio service support node also keeps track of individual MS's locations, security functions, and access controls. It is noted that the serving general packet radio service support node 1032 can be substantially similar to serving general packet radio service support node 404, and can include functionality described with respect to cellular serving general packet radio service support node 404 in system 400.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The gateway general packet radio service support node 1034 provides a gateway between the general packet radio service network and a public packet network. That is, the gateway general packet radio service support node provides interworking functionality with external networks, and sets up a logical link to the MS 1002 through the serving general packet radio service support node 1032. It is noted that the gateway general packet radio service support node 1034 can be substantially similar to gateway general packet radio service support node 402, and can include functionality described with respect to cellular gateway general packet radio service support node 402 in system 400.

In one aspect, the gateway general packet radio service support node 1034 is coupled to one or more digital mobile radio networks 314 via the digital mobile radio messaging gateway 102. Additionally or alternatively, the digital mobile radio messaging gateway 102 can be coupled to the serving general packet radio service support node 1032. Although it is depicted in FIG. 10 as residing outside the gateway general packet radio service support node 1034, the digital mobile radio messaging gateway 102 can reside within (e.g., completely or partially) the gateway general packet radio service support node 1034 (and/or short message service center 1009).

In order to access general packet radio service services, the MS 1002 first attaches itself to the general packet radio service network by performing an attach procedure. The MS 1002 then activates a packet data protocol context, thus activating a packet communication session between the MS 1002, the serving general packet radio service support node 1032, and the gateway general packet radio service support node 1034. In a global system for mobile communications/general packet radio service network, general packet radio service services and global system for mobile communications services can be used in parallel. A general packet radio service network 1030 can be designed to operate in three network operation modes (NOM1, NOM2 and NOM3). A network operation mode of a general packet radio service network is indicated by a parameter in system information messages transmitted within a cell. The system information messages dictates a MS where to listen for paging messages and how signal towards the network. The network operation mode represents the capabilities of the general packet radio service network.

The Internet protocol multimedia network 1038 was introduced with 3GPP Release 5, and includes an Internet protocol multimedia subsystem 1040 to provide rich multimedia services to end users. A representative set of the network entities within the Internet protocol multimedia subsystem 1040 are a call/session control function (CSCF), a media gateway control function (MGCF) 1046, a media gateway (MGW) 1048, and a master subscriber database, called a home subscriber server 1050. The home subscriber server 1050 can be common to the global system for mobile communications network 1001, the general packet radio service network 1030 as well as the Internet protocol multimedia network 1038.

The Internet protocol multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the Internet protocol multimedia subsystem 1040. The P-CSCF 1042 forwards session initiation protocol messages received from the MS to an session initiation protocol server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which home subscriber server 1050 to use for the particular subscriber, if multiple home subscriber servers 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming session initiation protocol session request to ensure appropriate service handling. This decision is based on information received from the home subscriber server 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002. The MME 1058 provides authentication of a user by interacting with the home subscriber server 1050 in long term evolution networks.

The home subscriber server 1050 contains a subscriber profile and keeps track of which core network node is currently handling the subscriber. It also supports subscriber authentication and authorization functions. In networks with more than one home subscriber server 1050, a subscriber location function provides information on the home subscriber server 1050 that contains the profile of a given subscriber.

The MGCF 1046 provides interworking functionality between session initiation protocol session control signaling from the Internet protocol multimedia subsystem 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with a PSTN network 1054 for TDM trunks. In addition, the MGCF 1046 communicates with the PSTN network 1054 for signaling system number 7 links. According to an embodiment, systems 100-400 and 500-700 disclosed herein can be implemented at least in part within and/or communicatively coupled to the global system for mobile communications network 1001, the general packet radio service network 1030, and/or the Internet protocol multimedia network 1038.

Figure 11:
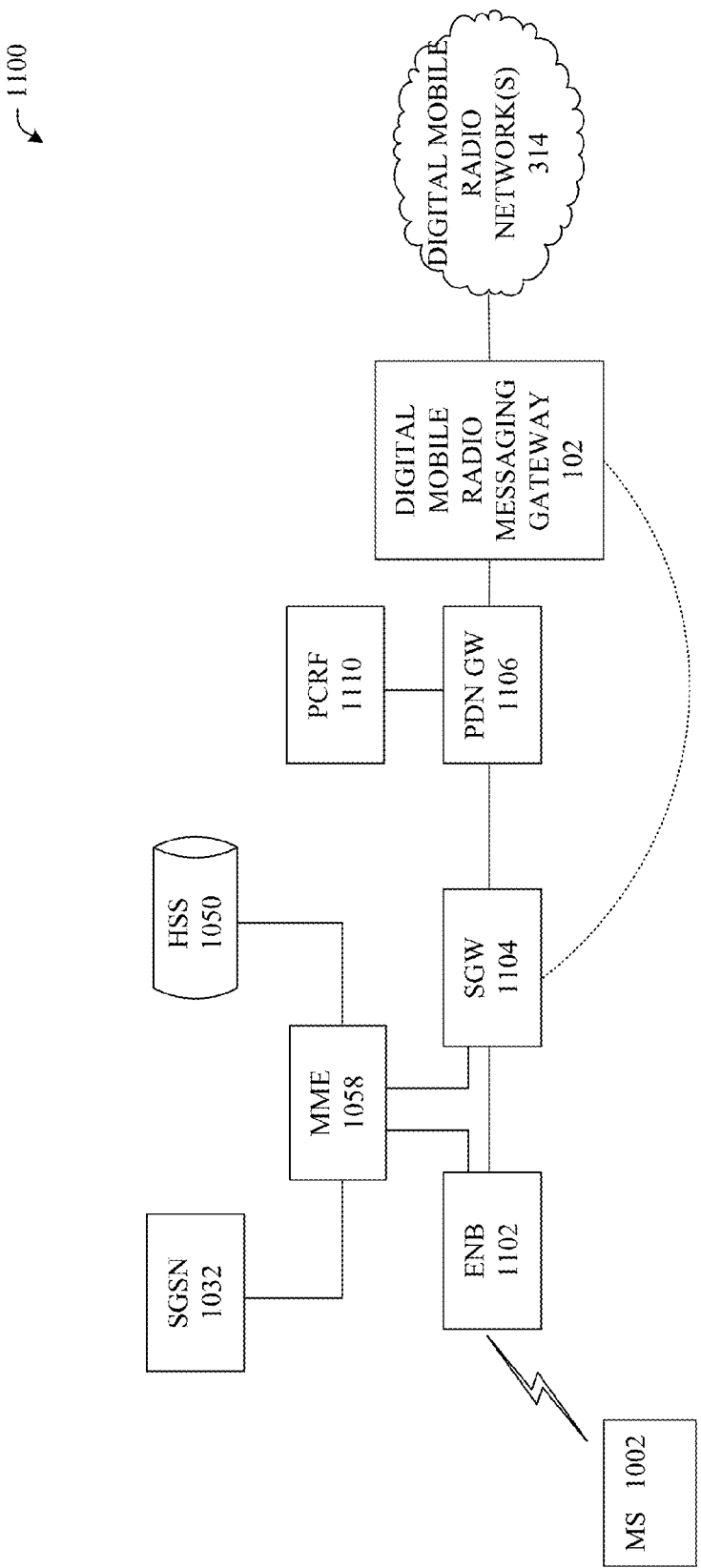
FIG. 11 illustrates a long term evolution network architecture that can employ the disclosed architecture.

FIG. 11 illustrates a high-level block diagram that depicts an example long term evolution network architecture 1100 that can employ the disclosed communication architecture. MS 1002, serving general packet radio service support node 1032, home subscriber server 1050, MME 1058, digital mobile radio messaging gateway 102, and digital mobile radio network 314 can include functionality as more fully described herein, for example, as described above with regard to systems 100, 200, 450-700, and 1000.

The evolved radio access network for long term evolution consists of an eNodeB (eNB) 1102 that can facilitate connection of MS 1002 to an evolved packet core (EPC) network. The connection of the MS 1002 to the evolved packet core (EPC) network is subsequent to an authentication, for example, a subscriber identity module-based authentication between the MS 1002 and the evolved packet core (EPC) network. As an example, the eNB 1102 can host a PHYsical (PHY), Medium Access Control (MAC), Radio Link Control (RLC), and Packet Data Control Protocol (PDCP) layers that include the functionality of user-plane header-compression and encryption. In addition, the eNB 1102 can implement at least in part Radio Resource Control (RRC) functionality (e.g., radio resource management, admission control, scheduling, cell information broadcast, etc.). The eNB 1102 can be coupled to a serving gateway 1104 that facilitates routing of user data packets and serves as a local mobility anchor for data bearers when the MS 1002 moves between eNBs. In addition, the serving gateway 1104 can act as an anchor for mobility between long term evolution and other 3GPP technologies (general packet radio service, universal mobile telecommunications system, etc.). When MS 1002 is in an idle state, the serving gateway 1104 terminates a downlink (DL) data path and triggers paging when DL data arrives for the MS 1002. Further, the serving gateway 1104 can perform various administrative functions in the visited network such as collecting information for charging and lawful interception.

In one aspect, the serving gateway 1104 can be coupled to a packet data network gateway 1106 that provides connectivity between the MS 1002 and external digital mobile radio network(s) 314 via the digital mobile radio messaging gateway 102. Additionally or alternatively, the digital mobile radio messaging gateway 102 can be coupled to the serving gateway 1104. Moreover, the packet data network gateway 1106 is a point of exit and entry of traffic for the MS 1002. It is noted that the MS 1002 can have simultaneous connectivity with more than one packet data network gateway (not shown) for accessing multiple PDNs.

The packet data network gateway 1106 performs Internet protocol address allocation for the MS 1002, as well as Quality of Service (QoS) enforcement and implements flow-based charging according to rules from a Policy Control and Charging Rules Function (PCRF) 1110. The PCRF 1110 can facilitate policy control decision-making and control flow-based charging functionalities in a Policy Control Enforcement Function (PCEF), which resides in the packet data network gateway 1106. The PCRF 1110 can store data (e.g., QoS class identifier and/or bit rates) that facilitates QoS authorization of data flows within the PCEF. In one aspect, the packet data network gateway 1106 can facilitate filtering of downlink user Internet protocol packets into the different QoS-based bearers and perform policy enforcement, packet filtering for each user, charging support, lawful interception and packet screening. Further, the packet data network gateway acts as the anchor for mobility between 3GPP and non-3GPP technologies such as WiMAX and 3GPP2 (CDMA 1X and EvDO). In one aspect, the packet data network gateway 1106 can be substantially similar to long term evolution gateway 452, and can include functionality described with respect to cellular long term evolution gateway 452 in system 450.

Although it is depicted in FIG. 11 as residing outside the packet data network gateway 1106, the digital mobile radio messaging gateway 102 can reside within (e.g., completely or partially) the packet data network gateway 1106. Although the global system for mobile communications/general packet radio service/Internet protocol multimedia network architecture 1000 and long term evolution network architecture 1100 is described and illustrated herein, it is noted that most any communication network architecture can be utilized to implement the disclosed embodiments.

Figure 12:
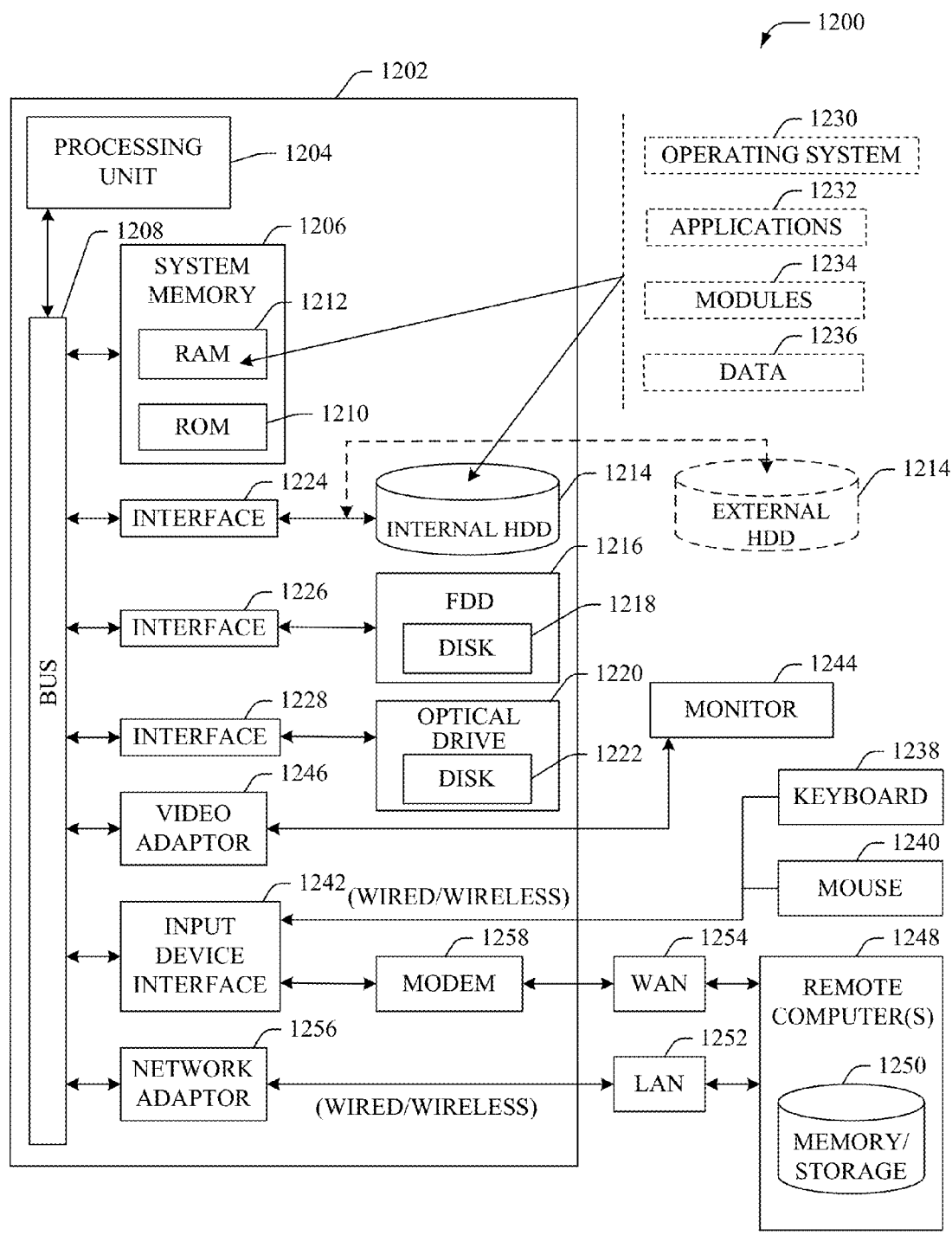
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the gateway(s), component(s), devices (s), and platform(s) (e.g., digital mobile radio messaging gateway 102, cellular gateway(s)/device(s) 104, digital mobile radio gateway(s)/device(s) 106, address mapping component 202, routing component 204, UE 302, short message service center 308, digital mobile radio device 304, digital mobile radio gateway 312, serving general packet radio service support node 404, gateway general packet radio service support node 402, long term evolution gateway 452, cellular gateway 502, enterprise system(s) 504, management component 602, security component 610, packetization component 702 etc.) disclosed herein with respect to system 100-700 can each include at least a portion of the computer 1202. In another example, a combination of the gateway(s), devices(s), component(s), server(s), and/or platform(s) can each include one or more computers such as, or substantially similar to, computer 1202. Further, each of the network element(s) (stand alone and/or in combination with one or more other network elements) disclosed herein with respect to systems 1000 and 1100 can include at least a portion of computer 1202, or can include one or more computers such as, or substantially similar to, computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated, but which may be integrated into UE 302 in some embodiments). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving data from a cellular gateway device of a cellular communication network;
   determining routing information for facilitating a transmission of the data to a mobile device of a communication network based on a communication protocol corresponding to a communication channel that is divided into two alternating timeslots corresponding to separate communication paths; and
   in response to determining, based on a message that is formatted according to an Internet protocol and directed to the mobile device utilizing the communication channel that is divided into the two alternating timeslots, a failure of the transmission of the data to the mobile device, sending, via a short message peer-to-peer protocol, a report representing the failure directed to the cellular gateway device.

2. The system of claim 1, wherein the operations further comprise:
   prior to the facilitating, adjusting the data according to a compatible communication protocol supported by a gateway device of the communication network.

3. The system of claim 2, wherein the compatible communication protocol comprises the Internet protocol.

4. The system of claim 1, wherein the data comprises a text message.

5. The system of claim 1, wherein the cellular gateway device comprises a short message service center device and wherein the receiving comprises receiving the data by employing the short message peer-to-peer protocol.

6. The system of claim 1, wherein the determining the routing information comprises determining the routing information for facilitating, via a digital mobile radio gateway of an Internet protocol-based digital mobile radio network, the transmission of the data to the mobile device.

7. The system of claim 6, wherein the routing information comprises routing code data associated with the digital mobile radio gateway.

8. The system of claim 1, wherein the operations further comprise:
   receiving, from a gateway device of the communication network, device profile data indicative of mobile devices that are coupled to the gateway device, and wherein the device profile data is employed to facilitate the transmission.

9. The system of claim 1, wherein the facilitating comprises:

receiving security profile data that is indicative of an access restriction; and facilitating the transmission based on the access restriction.

10. The system of claim 9, wherein the security profile data comprises device data indicative of cellular devices that are authorized to access the mobile device.

11. A method, comprising:

receiving, by a system comprising a processor, data that is to be transferred between a user equipment coupled to a cellular network device of a cellular communication network and a mobile device coupled to a communication network;

determining, by the system, routing information to facilitate a transmission of the data between the user equipment and the mobile device according to a communication protocol corresponding to a communication channel that has been divided into two alternating timeslots corresponding to separate communication paths; and in response to determining, based on an Internet protocol message that has been directed to the mobile device using the communication channel that has been divided into the two alternating timeslots, that an acknowledgement corresponding to the transmission of the data from the user equipment to the mobile device has not been received by the mobile device, sending, by the system using a short message peer-to-peer protocol, a status message representing a failure of the transmission directed to the user equipment.

12. The method of claim 11, further comprising:

based on security profile data associated with the mobile device, determining, by the system, that the transmission of the data has been authorized; and facilitating, by the system, the transmission of the data in accordance with the routing information.

13. The method of claim 12, wherein the facilitating comprises facilitating the transmission of the data to a gateway device within the communication network subsequent to conforming the data to a protocol determined to be supported by the gateway device, and wherein the data is to be transferred from the user equipment to the mobile device.

14. The method of claim 12, wherein the facilitating comprises facilitating the transmission of the data to a cellular gateway device of the cellular communication network subsequent to conforming the data to a protocol supported by the cellular gateway device, and wherein the data is to be transferred from the mobile device to the user equipment.

15. The method of claim 11, wherein the determining comprises determining the routing information based on routing code data received from a gateway device associated with the mobile device.

16. The method of claim 11, wherein the receiving comprises receiving a text message.

17. The method of claim 11, wherein the receiving comprises receiving call data associated with a voice call.

18. A non-transitory machine-readable storage medium, comprising executable instructions that, when executed by a processor, facilitate performance of operations, comprising:

receiving data that is to be transmitted from a user equipment of a cellular network to a mobile device of a communication network;

directing the data to a cellular gateway device of the cellular network via a first communication protocol supported by the cellular network, wherein the data is to be transferred from the cellular gateway device to the mobile device via a second communication protocol supported by the communication network, and wherein the second communication protocol corresponds to a communication channel that is divided into two alternating timeslots corresponding to separate communication paths; and in response to determining, based on a message that conforms to an Internet protocol and that has been directed to the mobile device according to the communication channel that is divided into the two alternating timeslots, a failure of a transfer of the data to the mobile device, sending a short message peer-to-peer protocol based message representing the failure directed to the cellular gateway device.

19. The non-transitory machine-readable storage medium of claim 18, wherein the receiving comprises receiving the data via a graphical interface of the user equipment.

20. The non-transitory machine-readable storage medium of claim 18, wherein the data comprises a text message.

* * * * *